United States Patent [19]

Mak

[11] Patent Number: 4,963,853

[45] Date of Patent: Oct. 16, 1990

[54] SIMULTANEOUS INBOUND MULTI-CHANNEL COMMUNICATION SYSTEM USING ELECTRICITY DISTRIBUTION NETWORK

[75] Inventor: Sioe T. Mak, Chesterfield, Mo.

[73] Assignee: Emerson Electric Co., St. Louis, Mo.

[21] Appl. No.: 421,794

[22] Filed: Oct. 16, 1989

[51] Int. Cl.⁵ .......................................... H04M 11/04
[52] U.S. Cl. ................................................ 340/310 A
[58] Field of Search ............ 340/310 A, 310 R, 825.5; 370/85.1; 375/25, 94

[56] References Cited

U.S. PATENT DOCUMENTS

| | | | |
|---|---|---|---|
| 4,106,007 | 8/1978 | Johnston et al. | 340/310 A |
| 4,218,655 | 8/1980 | Johnston et al. | 340/310 A |
| 4,763,103 | 8/1988 | Galula et al. | 340/310 A |
| 4,785,195 | 11/1988 | Rochelle et al. | 340/310 A |
| 4,800,363 | 1/1989 | Braun et al. | 340/310 A |

Primary Examiner—Joseph A. Orsino
Assistant Examiner—Frank M. Scutch, III
Attorney, Agent, or Firm—Polster, Polster and Lucchesi

[57] ABSTRACT

A communication system with six simultaneous independent inbound channels is disclosed which uses the voltage waveform of an electricity distribution network as a carrier. The manner in which the inbound channels are identified as well as how various sets of such independent channels can be found is disclosed. Identification of sets or groups of such independent channels involves identifying all potential channels and calculating the detection algorithm for each. Pure pulse patterns for binary "1"s for each channel are then multiplied by the detection algorithms for every channel to generate a matrix whose elements include the application of all the detection algorithms to all the aforementioned pulse patterns. Examination of qualifying elements of the matrix allow the identification of sets of mutually non-interfering channels.

20 Claims, 1 Drawing Sheet

SIMULTANEOUS INBOUND MULTI-CHANNEL COMMUNICATION SYSTEM USING ELECTRICITY DISTRIBUTION NETWORK

BACKGROUND OF THE INVENTION

This invention relates to a system for extracting information from a carrier wave and relates generally to the method and apparatus described in U.S. Pat. Nos. 4,106,007 and 4,218,655, the disclosures of which are incorporated herein by reference. As described in those patents, it is known that a modulation voltage can be superimposed on a power system voltage, at specified locations on the power system voltage such as a zero crossing, to cause wave shape perturbations in the carrier wave. In the embodiment described hereinafter, the carrier wave is the voltage wave of an electrical power distribution system.

Communication over electric power distribution lines is useful for signaling, meter reading, and load control, among other uses. However, communication over an electric distribution system is a complex undertaking. Each customer service constitutes a branch in the distribution feeder, and the branching is so extensive that it is impractical to provide filter and by-pass circuitry at each branch point. The distribution system is not an attractive medium for conventional communications due to the attenuation and dispersion of the signals and because noise levels tend to be high. To overcome the high noise levels, it is generally necessary to use narrow band filtering, error-detecting and error-correcting codes, and relatively high signal power levels at low bit rates.

The aforementioned problems arise in two areas. The first concerns transmitting information from the central source in the direction of energy flow to the individual customer premises. This transmission of information in the direction of energy flow is referred to as "outbound" signaling. Functions such as automatic meter reading and various alarm systems, however, require that information passes not only from a single source to the end user, but also from the end user back to the central station. This transmission of information in the direction opposite to that of the energy flow is referred to herein as "inbound" signaling.

In the system described in the aforementioned patents, each binary digit (a binary "1" or a binary "0") is made up of four current pulse modulations located at preselected zero crossings of the electrical distribution network voltage waveform. These current pulses are located within eight zero crossings (four complete cycles) of the waveform and the current pulse patterns for "1s" and "0s" are complementary.

By using different pulse patterns to define binary "1s" and "0s," it is possible to define a number of separate channels over which information can be transmitted in each eight half-cycle segment of the waveform. Heretofore, however, it has been difficult to identify sets or groups of such channels which were independent or non-interfering, i.e., channels with the property that the presence of a signal on one channel of the set did not interfere with the detection and identification or a signal on another channel of the set.

Furthermore, it has proven extremely difficult to determine the maximum number of non-interfering channels for any given system configuration and to identify sets of channels containing the maximum number of non-interfering channels.

SUMMARY OF THE INVENTION

One of the objects of this invention is to provide a method for improving the transmission rate of inbound information in an electric distribution system.

Another object of this invention is to provide a system with the maximum possible number of independent, non-interfering channels.

Another object is to provide a generalized yet effective method for determining the maximum number of independent, non-interfering channels in a given system.

A four object is to provide a method for identifying groups of channels which have the maximum possible number of independent, non-interfering channels.

Other objects and features of this invention will be in part apparent and in part pointed out hereafter.

Briefly, in a first aspect a system of the present invention is designed to substantially simultaneously transmit signals composed of binary digits inbound over an electricity distribution network and detect said simultaneously transmitted inbound signals. Each binary digit transmitted is composed of a first predetermined number of current pulses superimposed on preselected zero crossings contained within the first predetermined number of cycles of the voltage waveform of the electricity distribution network. The system includes designating a second predetermined number of channels (the second predetermined number being at least fifty percent greater than the first predetermined number), each channel being defined by specifying the set of zero crossings which define a binary "1" for that channel and the set of zero crossings which define a binary "0" for that channel. The sets of zero crossings for each channel are mutually exclusive and each contains the first predetermined number of zero crossings. Each set of zero crossings is unique with respect to all the other sets for the various channels. The system further includes sending binary digits inbound simultaneously over the second predetermined number of channels. For the first predetermined number of cycles of the voltage waveform, the magnitudes of the current pulses at all the zero crossings are measured. Also for each channel, a detection algorithm is applied to the measured magnitudes of the current pulses for all the zero crossings. Each detection algorithm is unique with respect to all the other detection algorithms, the detection algorithms being selected so that all the designated channels are non-interfering even though all use exactly the same zero crossings of the voltage waveform. A binary "1" is detected for any particular channel if the application of the detection algorithm for that channel to the measured magnitudes of the current pulses for all the zero crossings equals a third predetermined number. A binary "0" is detected for any particular channel if the application of the detection algorithm for that channel to the measured magnitudes of the current pulses for all the zero crossings equals the negative of the third predetermined number. And the absence of a binary digit for any particular channel is detected if the application of the detection algorithm for that channel to the measured magnitudes of the current pulses for all the zero crossings equals a number other than the third predetermined number or its negative.

In a second aspect a method of the present invention is directed to identifying non-interfering inbound channels in a system for substantially simultaneously transmitting signals composed of binary digits inbound over an electricity distribution network and to detecting said simultaneously transmitted inbound signals. Each binary digit is composed of a first predetermined number of current pulses superimposed on preselected zero crossings contained within a second predetermined numbers of cycles of the voltage waveform of the electricity distribution network. Each channel is defined by specifying the set of zero crossings which define a binary "1" for that channel and the set of zero crossings which define a binary "0" for that channel. The sets of zero crossings for each channel are mutually exclusive and each contains the first predetermined number of zero crossings. The method includes the steps of identifying the potential channels by organizing the zero crossings in the second predetermined number of cycles of the electricity distribution network waveform into sets, each set containing the first predetermined number of separate zero crossings. Each pair of mutually exclusive sets constitutes a potential channel. First and second pure pulse patterns are defined for each potential channel, each pure pulse pattern being a set of "j" numbers, where "j" is the number of zero crossings in the second predetermined number of cycles of the waveform. One of the pure pulse patterns for each channel represents the presence of a binary "1" in that channel with no signal present in any other channel and the other pure pulse pattern for each channel represents the presence of a binary "0" in that channel with no signal present in any other channel. Each pure pulse pattern is unique. Detection matrices are selected for the channels, each detection matrix being unique with respect to the other detection matrices. Each detection matrix when multiplied by a pure pulse pattern results in a first preselected number when the pure pulse pattern represents a binary "1" in the channel corresponding to that detection matrix, results in a second preselected number when the pure pulse pattern represents a binary "0" in the channel corresponding to that detection matrix, and results in a third preselected number when no signal is present. A composite detection matrix is formed from the detection matrixes for all the potential channels, each row of the composite detection matrix being the detection matrix for the channel corresponding to the row number of that row. A composite pulse pattern matrix is formed from the first pure pulse patterns for each channel, each column of the composite pulse pattern matrix being the first pure pulse pattern for the channel corresponding to the column number of that column. The composite detection matrix is multiplied by the composite pulse pattern matrix to form a channel analysis matrix, each element of the channel analysis matrix being a number resulting from the application of the detection matrix for the channel corresponding to the column number of the element to the first pure pulse pattern for the channel corresponding to the row number of the element. The method also involves categorizing as qualifying elements only those elements of the channel analysis matrix whose numerical value corresponds to the first preselected number or the third preselected number. Independent channels are identified by determining which sets of rows of the channel analysis matrix have in common qualifying elements in the columns corresponding to all the row numbers of the set. The row numbers of each such set represent a set of independent channels.

BRIEF DESCRIPTION OF THE DRAWINGS

Similar reference characters indicate similar parts throughout the various views of the drawing.

DESCRIPTION OF THE PREFERRED EMBODIMENT

The present invention is specifically for use with communications systems using the already existing electric distribution system connected to each premises to provide the carrier. More particularly, the method of this invention generates the number and identity of available channels and determines combinations of non-interfering multi-channels for simultaneous inbound transmission.

Signalling using these types of communications systems is done by drawing current pulses near the zero crossings of the voltage of the 60 Hz system voltage. In the system described herein, it is further required that binary digit or bit "1" or bit "0" consists of a combination of number of current pulses within a fixed number of cycles of 60 Hz, typically four pulses with four cycles.

For each bit the number of positive current pulses is equal to the number of negative current pulses to prevent distribution transformers go into saturation. Thus, a binary "1" would have two positive current pulses and two negative current pulses, as would a binary "0". A final system constraint is the detection algorithm structure. An acceptable detection algorithm for a particular channel should be capable to detect bit "1", bit "0" or no signal at all for that channel. This restriction maximizes the distance between bit "1" and bit "0"

Figure 1:
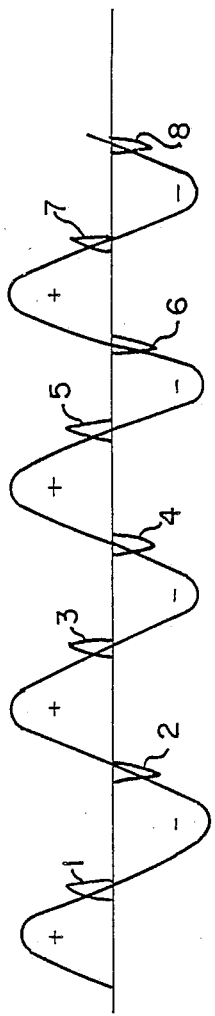
FIG. 1 is a graphical representation of a standard eight half-cycles of the electricity distribution waveform showing the eight preferred locations for information carrying current pulses.

In FIG. 1 all the possible current pulses are shown and labelled 1, 2, 3, 4, 5, 6, 7, and 8. Pulses 1, 3, 5, and 7 each have a strength +1. Pulses 2, 4, 6, and 8 each have a strength −1. Of course, FIG. 1 does not represent either a binary "1" or a binary "0" since both those have only four current pulses. Rather FIG. 1 illustrates the positions and nomenclature for all the possible current pulses. The same nomenclature used to identify the current pulses can also be used to identify the zero crossings at which those current pulses occur. Pulses having a strength of +1 all occur at positive-to-negative zero crossings, while those having a strength of −1 all occur at negative-to-positive zero crossings.

It should be understood that the actual magnitude of the current pulses may differ from +1 or −1 in those instances where signals are present on more than one channel.

Each bit is defined as a combination of four pulses. Since eight half cycles are defined to contain one bit, then bit "1" and bit "0" are complements of each other. This restriction is, of course, for purposes of illustration only. Communications systems with other relationships between binary "1" and binary "0" could still benefit from the application of the present invention.

A detection algorithm or detection matrix is an ordered set of numbers consisting of +1 and −1, which when operated on a valid bit pattern in a certain fashion (namely matrix multiplication) results in either +4 or −4. Specifically, when the result is +4, that indicates that a binary bit "1" is detected. Similarly, −4 indicates that a binary bit "0" is detected and 0 indicates no binary bit is detected.

Let $a_k$ represent the signal strength magnitude (including sign) for the current pulses actually received by a receiver for the set of eight zero crossings 1–8. If one and only one signal is present in that eight half-cycle segment of the waveform, then the pulse pattern (called a pure pulse pattern) is described by the following column matrix $[F_k]$:

$$[F_k] = \begin{matrix} a_1 \\ a_2 \\ a_3 \\ a_4 \\ a_5 \\ a_6 \\ a_7 \\ a_8 \end{matrix} \quad \begin{matrix} \text{Four of } a_1, a_2, \ldots a_8 \text{ have strength} \\ \text{zero. The remaining four have strengths} \\ -1 \text{ or } +1. \text{ Of those four, two have strengths} \\ -1 \text{ and the remaining two have strengths } +1. \end{matrix}$$

For those "$a_k$"s which represent a current pulse, the indices indicate the polarity of the pulse. Indices 1, 3, 5, and 7 indicate that the "$a_k$"s referred to by any of these indices have strengths +1 if current pulses are present at the corresponding zero crossings. Similarly "$a_k$"s with indices 2, 4, 6, and 8 have strengths −1 if current pulses are present at the corresponding zero crossings.

The pulse pattern matrix is operated on by a detection matrix to determine the presence and identity of any signal in the eight half-cycle segment of the waveform under consideration. The detection matrix $[D_k]$ for each channel "k" is a row matrix $(d_1, d_2, d_3, d_4, d_5, d_6, d_7, d_8)$ where the "$d_k$"s can have values +1 or −1.

A detection is defined as follows:

$$A_k = [D_k] \times [F_k]$$
$$= d_1a_1 + d_2a_2 + d_3a_3 + \ldots + d_8a_8.$$

In this scheme, if $A_k = +4$, then binary bit "1" has been detected. If $A_k = -4$, then bit "0" has been detected. And if $A_k = 0$, then the pulse pattern $[F_k]$ represents a signal in a different channel.

Now, consider the possible or potential channels present in the communication system described above. There are eight zero crossings in each segment of the waveform under consideration and for each binary "1" or binary "0" four of those zero crossings are used. Consider all the possible combinations:

| COLUMN I | COLUMN II |
| --- | --- |
| 1 2 3 4 | 2 3 4 5 |
| 1 2 3 5 | 2 3 4 6 |
| 1 2 3 6 | 2 3 4 7 |
| 1 2 3 7 | 2 3 4 8 |
| 1 2 3 8 | 2 3 5 6 |
| 1 2 4 5 | 2 3 5 7 |
| 1 2 4 6 | 2 3 5 8 |
| 1 2 4 7 | 2 3 6 7 |
| 1 2 4 8 | 2 3 6 8 |
| 1 2 5 6 | 2 3 7 8 |
| 1 2 5 7 | 2 4 5 6 |
| 1 2 5 8 | 2 4 5 7 |
| 1 2 6 7 | 2 4 5 8 |
| 1 2 6 8 | 2 4 6 7 |
| 1 2 7 8 | 2 4 6 8 |

-continued

| COLUMN I | COLUMN II |
| --- | --- |
| 1 3 4 5 | 2 5 7 8 |
| 1 3 4 6 | 2 5 6 7 |
| 1 3 4 7 | 2 5 6 8 |
| 1 3 4 8 | 2 5 7 8 |
| 1 3 5 6 | 2 6 7 8 |
| 1 3 5 7 | 3 4 5 6 |
| 1 3 5 8 | 3 4 5 7 |
| 1 3 6 7 | 3 4 5 8 |
| 1 3 6 8 | 3 4 6 7 |
| 1 3 7 8 | 3 4 6 8 |
| 1 4 5 6 | 3 4 7 8 |
| 1 4 5 7 | 3 5 6 7 |
| 1 4 5 8 | 3 5 6 8 |
| 1 4 6 7 | 3 5 7 8 |
| 1 4 6 8 | 3 6 7 8 |
| 1 4 7 3 | 4 5 6 7 |
| 1 5 6 7 | 4 5 6 8 |
| 1 5 6 8 | 4 5 7 8 |
| 1 5 7 8 | 4 6 7 8 |
| 1 6 7 8 | 5 6 7 8 |

Because of the way the combinations have been arranged, each combination in column I has a complement in column II, as is revealed by inspection. Of course, the digits in each combination represent the indices of a pattern of pulses which define a binary bit. Thus, for example, every combination in column I can be used to define binary bit "1" and every combination in column II can be used to define binary bit "0." Of course, not all these combinations exhibit all the constraints set forth above for the communications system under discussion, namely:

(1) No more than two pulses can have the same polarity.
(2) Indices 1, 3, 5, and 7 indicate positive current pulses and are odd numbers.
(3) Indices 2, 4, 6, and 8 indicate negative current pulses and are even numbers.

To comply with requirement (1), there can be two and only two positive numbers and two and only two negative numbers in each combination. All combinations which have more than two odd or two even numbers can therefore be deleted from consideration. The net result is shown below, rearranged so that complementary combinations are aligned:

| CHANNEL # | COLUMN I, BIT "1" | COLUMN II, BIT "0" |
| --- | --- | --- |
| 1 | 1 2 3 4 | 5 6 7 8 |
| 2 | 1 2 3 6 | 4 5 7 8 |
| 3 | 1 2 3 8 | 4 5 6 7 |
| 4 | 1 2 4 5 | 3 6 7 8 |
| 5 | 1 2 4 7 | 3 5 6 8 |
| 6 | 1 2 5 6 | 3 4 7 8 |
| 7 | 1 2 5 8 | 3 4 6 7 |
| 8 | 1 2 6 7 | 3 4 5 8 |
| 9 | 1 2 7 8 | 2 4 5 6 |
| 10 | 1 3 4 6 | 2 5 7 8 |
| 11 | 1 3 4 8 | 2 5 6 7 |
| 12 | 1 3 6 8 | 2 4 5 7 |
| 13 | 1 4 5 6 | 2 3 7 8 |
| 14 | 1 4 5 8 | 2 3 6 7 |
| 15 | 1 4 6 7 | 2 3 5 8 |
| 16 | 1 4 7 8 | 2 3 5 6 |
| 17 | 1 5 6 8 | 2 3 4 7 |
| 18 | 1 6 7 8 | 2 3 4 5 |

Thus, there are eighteen available single channels. As stand alone channels they are useful. The next step is to determine the detection algorithms for the various channels. This procedure is best understood by means of an example. Take for instance channel 5. The indices are:

| | |
|---|---|
| for bit "1" — | 1, 2, 4, 7 |
| and for bit "0" — | 3, 5, 6, 8. |

The equivalent bit "1" structure (the pure pulse pattern for a binary "1") is:

$[F_5] = (+1, -1, 0, -1, 0, 0, +1, 0)$.

Similarly, the pure pulse pattern for a binary "0" is
$[F_5] = (0, 0, +1, 0, +1, -1, 0, -1)$.

The detection matrix for this channel by definition is described as follows:

$[D_5] = (d_1, d_2, d_3, d_4, d_5, d_6, d_7, d_8)$.

For a pulse pattern representing a binary "1,"

$$A_5 = \frac{17}{18} [D_5] \times [F_5]$$

$$= (d_1 \times 1) + (d_2 \times (-1)) + (d_3 \times 0) +$$
$$(d_4 \times (-1)) + (d_5 \times 0) + (d_6 \times 0) +$$
$$(d_7 \times 1) + (d_8 \times 0)$$

$$= d_1 - d_2 - d_4 + d_7.$$

Since $A_5 = 4$ when the binary digit is "1" and since each of the $d_k$s has a magnitude of either "1" or "$-1$," if follows that $d_1 = +1$, $d_2 = -1$, $d_4 = -1$ and $d_7 = +1$. Substituting these numbers in $[D_5]$, one obtains $[D_5] = (+1, -1, d_3, -1, d_5, d_6, +1, d_8)$.

Performing the same operation with the pure pulse pattern for bit "0," one finds that $A_5 = 0 + 0 + d_3 + 0 + d_5 - d_6 + 0 - d_8$.

Because $A_5$ in this instance must equal $-4$, $d_3$ and $d_5$ must equal $-1$ and $d_6$ and $d_8$ must equal $+1$. The detection matrix for channel 5, therefore, is $[D_5] = (+1, -1, -1, -1, -1, +1, +1, +1)$.

From the pure pulse patterns for a binary "1" in all the channels, one can make a composite pulse pattern matrix $[F_{"1"}]$ in which each column of the matrix is composed of the pure binary "1" pulse pattern for the channel corresponding to that column number. Similarly, one can make a composite pulse pattern matrix $[F_{"0"}]$ in which each column of the matrix is composed of the pure binary "0" pulse pattern for the channel corresponding to that column number. Of course, $[F_{"1"}]$ and $[F_{"0"}]$ are complementary.

The channel detection matrices $[D_k]$ for the various channels, once computed as discussed above, may also be combined into a composite detection matrix $[D]$ with the detection matrix for a channel forming the corresponding row of the composite detection matrix. These three matrices are set forth below:

$[F_{"1"}] =$

| +1 | +1 | +1 | +1 | +1 | +1 | +1 | +1 | +1 | +1 | +1 | +1 | +1 | +1 | +1 | +1 | +1 | +1 |
|---|---|---|---|---|---|---|---|---|---|---|---|---|---|---|---|---|---|
| -1 | -1 | -1 | -1 | -1 | -1 | -1 | -1 | -1 | 0 | 0 | 0 | 0 | 0 | 0 | 0 | 0 | 0 |
| +1 | +1 | +1 | 0 | 0 | 0 | 0 | 0 | 0 | +1 | +1 | +1 | 0 | 0 | 0 | 0 | 0 | 0 |
| -1 | 0 | 0 | -1 | -1 | 0 | 0 | 0 | 0 | -1 | -1 | 0 | -1 | -1 | -1 | -1 | 0 | 0 |
| 0 | 0 | 0 | +1 | 0 | +1 | +1 | 0 | 0 | 0 | 0 | +1 | +1 | 0 | 0 | +1 | 0 |  |
| 0 | -1 | 0 | 0 | 0 | -1 | 0 | -1 | 0 | -1 | 0 | -1 | -1 | 0 | -1 | 0 | -1 | -1 |
| 0 | 0 | 0 | 0 | +1 | 0 | 0 | +1 | +1 | 0 | 0 | 0 | 0 | +1 | +1 | 0 | +1 |  |
| 0 | 0 | -1 | 0 | 0 | 0 | -1 | 0 | -1 | 0 | -1 | -1 | 0 | -1 | 0 | -1 | -1 | -1 |

Channel Nos. 1 2 3 4 5 6 7 8 9 10 11 12 13 14 15 16 17 18

$[F_{"0"}] =$

| 0 | 0 | 0 | 0 | 0 | 0 | 0 | 0 | 0 | 0 | 0 | 0 | 0 | 0 | 0 | 0 | 0 | 0 |
|---|---|---|---|---|---|---|---|---|---|---|---|---|---|---|---|---|---|
| 0 | 0 | 0 | 0 | 0 | 0 | 0 | 0 | 0 | -1 | -1 | -1 | -1 | -1 | -1 | -1 | -1 | -1 |
| 0 | 0 | 0 | +1 | +1 | +1 | +1 | +1 | +1 | 0 | 0 | 0 | +1 | +1 | +1 | +1 | +1 | +1 |
| 0 | -1 | -1 | 0 | 0 | -1 | -1 | -1 | -1 | 0 | 0 | -1 | 0 | 0 | 0 | 0 | -1 | -1 |
| +1 | +1 | +1 | 0 | +1 | 0 | 0 | +1 | +1 | +1 | +1 | 0 | 0 | +1 | +1 | 0 | +1 |  |
| -1 | 0 | -1 | -1 | -1 | 0 | -1 | 0 | -1 | 0 | -1 | 0 | 0 | -1 | 0 | -1 | 0 | 0 |
| +1 | +1 | +1 | +1 | 0 | +1 | +1 | 0 | 0 | +1 | +1 | +1 | +1 | +1 | 0 | 0 | +1 | 0 |
| -1 | -1 | 0 | -1 | -1 | -1 | 0 | -1 | 0 | -1 | 0 | 0 | -1 | 0 | -1 | 0 | 0 | 0 |

Channel Nos 1 2 3 4 5 6 7 8 9 10 11 12 13 14 15 16 17 18

$[D] =$

| Channel Nos. | | | | | | | | |
|---|---|---|---|---|---|---|---|---|
| 1 | +1 | -1 | +1 | -1 | -1 | +1 | -1 | +1 |
| 2 | +1 | -1 | +1 | +1 | -1 | -1 | -1 | +1 |
| 3 | +1 | -1 | +1 | +1 | -1 | +1 | -1 | -1 |
| 4 | +1 | -1 | -1 | -1 | +1 | +1 | -1 | +1 |
| 5 | +1 | -1 | -1 | -1 | -1 | +1 | +1 | +1 |
| 6 | +1 | -1 | -1 | +1 | +1 | -1 | -1 | +1 |
| 7 | +1 | -1 | -1 | +1 | +1 | +1 | -1 | -1 |
| 8 | +1 | -1 | -1 | +1 | -1 | -1 | +1 | +1 |
| 9 | +1 | -1 | -1 | +1 | -1 | +1 | +1 | -1 |
| 10 | +1 | +1 | +1 | -1 | -1 | -1 | -1 | +1 |
| 11 | +1 | +1 | +1 | -1 | -1 | +1 | -1 | -1 |
| 12 | +1 | +1 | +1 | +1 | -1 | -1 | -1 | -1 |
| 13 | +1 | +1 | -1 | -1 | +1 | -1 | -1 | +1 |
| 14 | +1 | +1 | -1 | -1 | -1 | +1 | +1 | -1 |
| 15 | +1 | +1 | -1 | -1 | -1 | -1 | +1 | +1 |
| 16 | +1 | +1 | -1 | -1 | -1 | +1 | +1 | -1 |
| 17 | +1 | -1 | -1 | +1 | -1 | -1 | -1 | +1 |
| 18 | +1 | +1 | -1 | +1 | -1 | -1 | +1 | -1 |

In the matrices set forth above, each column in $[F_{"1"}]$ represents a channel pattern for bit "1" in the channel corresponding to the column number. Each column in $[F_{"0"}]$ represents a channel pattern for bit "0" in the channel corresponding to the column number. And each one or row in $[D]$ represents a channel detection algorithm for the channel corresponding to the row number.

From these matrices, the inventor has discovered, one can identify simultaneous non-interfering multi-channels. To do this, multiply the following matrices:

$[A_{\text{``1''}}] = [D] * [F_{\text{``1''}}]$, where $[D]$ and $[F_1]$ are as defined above. $[A_{\text{``1''}}]$ is therefore a matrix whose elements represent the application of the detection algorithms for all the channels to the pur binary "1" bit patterns for all the channels. The elements of matrix $[A_{\text{``1''}}]$ along the diagonal will be the result of the application of the detection algorithm for a particular channel to the binary "1" bit pattern for that channel. The other elements of matrix $[A_{\text{``1''}}]$ all represent "hybrid" results where the detection algorithm for any particular channel is applied to the binary "1" bit pattern for each channel but its own. These elements, therefore, in a sense represent cross-talk in the detection scheme between channels. Any analysis of matrix $[A_{\text{``1''}}]$ does not have to be repeated on matrix $[A_{\text{``0''}}]$ (resulting from the multiplication of matrix $[D]$ and matrix $[F_{\text{``1''}}]$) because of the complementary nature of matrix $[F_{\text{``1''}}]$ to $[F_{\text{``1''}}]$.

The result of this matrix multiplication is:

The first number, +2, is the result of the detection algorithm for channel 11 applied to the bit pattern for a binary "1" for channel "1". In general the numbers in the column are obtained by applying the detection algorithm for channel 11 to the bit pattern for a binary "1" for each of the eighteen channels.

When the detection algorithm for channel 11 is applied to channel 11, the result is a +4. All other numbers in this column are 1, −2, and +2.

Consider a more formal definition of non-interference, independence, or "transparency" for simultaneous multi-channel communications. Given an arbitrary set of simultaneous channel samples $[F_J]$ and detection algorithm matrices $[D_K]$, where matrices $[F_J]$ and $[D_K]$ are row matrices, one can define "transparency" for any two channels "J" and "K" as being the condi-

| Algorithm No. | | 1 | 2 | 3 | 4 | 5 | 6 | 7 | 8 | 9 | 10 | 11 | 12 | 13 | 14 | 15 | 16 | 17 | 18 |
|---|---|---|---|---|---|---|---|---|---|---|---|---|---|---|---|---|---|---|---|
| | (1) | +4 | +2 | +2 | +2 | +2 | 0 | 0 | 0 | 0 | +2 | +2 | 0 | 0 | 0 | 0 | 0 | −2 | −2 |
| | (2) | +2 | +4 | +2 | 0 | 0 | +2 | +2 | +2 | 0 | +2 | 0 | +2 | 0 | −2 | 0 | −2 | 0 | 0 |
| | (3) | +2 | +2 | +4 | 0 | 0 | 0 | +2 | 0 | +2 | 0 | +2 | +2 | −2 | 0 | −2 | 0 | 0 | 0 |
| | (4) | +2 | 0 | 0 | +4 | +2 | +2 | +2 | 0 | 0 | 0 | 0 | −2 | +2 | +2 | 0 | 0 | 0 | −2 |
| | (5) | +2 | 0 | 0 | +2 | +4 | 0 | 0 | +2 | +2 | 0 | −2 | 0 | 0 | +2 | +2 | −2 | 0 | 0 |
| | (6) | 0 | +2 | 0 | +2 | 0 | +4 | +2 | +2 | 0 | 0 | −2 | 0 | +2 | 0 | 0 | −2 | +2 | 0 |
| | (7) | 0 | 0 | +2 | +2 | 0 | +2 | +4 | 0 | +2 | −2 | 0 | 0 | 0 | +2 | −2 | 0 | +2 | 0 |
| $[A_{\text{``1''}}] =$ | (8) | 0 | +2 | 0 | 0 | +2 | +2 | 0 | +4 | +2 | 0 | −2 | 0 | 0 | −2 | +2 | 0 | 0 | +2 |
| | (9) | 0 | 0 | +2 | 0 | +2 | 0 | +2 | +2 | +4 | −2 | 0 | 0 | −2 | 0 | 0 | +2 | 0 | +2 |
| | (10) | +2 | +2 | 0 | 0 | 0 | 0 | −2 | 0 | −2 | +4 | +2 | +2 | +2 | 0 | +2 | 0 | 0 | 0 |
| | (11) | +2 | 0 | +2 | 0 | 0 | −2 | 0 | −2 | 0 | +2 | +4 | +2 | 0 | +2 | 0 | +2 | 0 | 0 |
| | (12) | 0 | +2 | +2 | −2 | −2 | 0 | 0 | 0 | 0 | +2 | +2 | +4 | 0 | 0 | 0 | 0 | +2 | +2 |
| | (13) | 0 | 0 | −2 | +2 | 0 | +2 | 0 | 0 | −2 | +2 | 0 | 0 | +4 | +2 | +2 | 0 | +2 | 0 |
| | (14) | 0 | −2 | 0 | +2 | 0 | 0 | +2 | −2 | 0 | 0 | +2 | 0 | +2 | +4 | 0 | +2 | +2 | 0 |
| | (15) | 0 | 0 | −2 | 0 | +2 | 0 | −2 | +2 | 0 | +2 | 0 | 0 | +2 | 0 | +4 | +2 | 0 | +2 |
| Channel (16) | | 0 | −2 | 0 | 0 | +2 | −2 | 0 | 0 | +2 | 0 | +2 | 0 | 0 | +2 | +2 | +4 | 0 | +2 |
| Numbers (17) | | −2 | 0 | 0 | 0 | −2 | +2 | +2 | 0 | 0 | 0 | 0 | +2 | +2 | +2 | 0 | 0 | +4 | +2 |
| | (18) | −2 | 0 | 0 | −2 | 0 | 0 | 0 | +2 | +2 | 0 | 0 | +2 | 0 | 0 | +2 | +2 | +2 | +4 |

The significance of matrix $[A_{\text{``1''}}]$ can be seen by an example. Take column 11, for instance, which is:

$$\text{Column 11} = \begin{matrix} +2 \\ 0 \\ +2 \\ 0 \\ 0 \\ -2 \\ 0 \\ -2 \\ 0 \\ +2 \\ +4 \\ +2 \\ 0 \\ +2 \\ 0 \\ +2 \\ 0 \\ 0 \end{matrix}$$

tion where all three of the following requirements are true:

1. $[D_k] * [F_j]$ = +4 if K = J and a binary bit "1" is present
2. = −4 if K = J and a binary bit "0" is present, and
3. = 0 if K does not equal J.

In essence this means the following: A detection algorithm for a certain channel operating on the same channel results in +4 or −4 depending upon whether that channel has a bit pattern representing a binary "1" or "0". The same detection algorithm applied to any other channel should result in a 0 no matter what signal is being transmitted over that other channel.

Since matrix $[A_{\text{``1''}}]$ is obtained by applying all eighteen detection algorithms to all eighteen bit patterns which define a binary bit "1" for the various channels, one can use matrix $[A_{\text{``1''}}]$ to examine channels for "transparency." Specifically, only those elements of matrix $[A_{\text{``1''}}]$ that are +4 or 0 are of interest in this analysis. The other elements can be blanked out or ignored. The result of considering only the qualifying elements +4 and 0 in matrix $[A_{\text{``1''}}]$ is shown below, where all qualifying elements are indicated by the letter "X" and all other elements in the matrix have been removed, leaving spaces.

| | 1 | 2 | 3 | 4 | 5 | 6 | 7 | 8 | 9 | 10 | 11 | 12 | 13 | 14 | 15 | 16 | 17 | 18 |
|---|---|---|---|---|---|---|---|---|---|---|---|---|---|---|---|---|---|---|
| 1 | X | | | | | X | X | X | X | | | X | X | X | X | X | | |
| 2 | | X | | X | X | | X | | | X | | X | | X | | X | X | |
| 3 | | | X | X | X | X | | X | | | X | | X | | X | X | X | |
| 4 | | X | X | X | | | | X | X | X | X | | | X | X | X | | |

-continued

```
 5      X   X         X   X   X            X   X         X   X                 X  _
 6_X         X         X   X            X   X         X   X   X                X     _
 7_X   X               X         X   X            X   X   X            X            X _
 8_X         X   X            X   X         X            X   X            X   X       
 9_X   X         X         X            X         X   X         X   X         X       = [A_z]
10            X   X   X   X         X         X                     X         X   X   X
11      X         X   X         X         X         X                  X         X   X _
12_X                     X   X   X   X            X   X   X   X   X                   
13_X   X                  X   X            X   X   X            X            X  _
14_X         X         X   X            X   X         X            X   X            X _
15_X   X         X   X   X            X            X   X         X   X         X       
16_X         X   X            X   X         X            X   X            X   X       
17      X   X   X               X   X   X   X                  X   X   X             
18      X   X         X   X   X            X   X         X   X                     X
```

The entries of this matrix, designated $[A_x]$, have virtual symmetry with respect to the diagonal. Matrix $[A_x]$ is directly usable to determine sets of non-interfering, simultaneous channels.

When one draws a line across rows, 1, 6, 9, 12, 14 and 15, each line hits the following "X"s as shown below, where the detection algorithm number is substituted for the "X" each time an "X" is hit.

| Row No. | | | | | | | | | | | | | | | | | | |
|---|---|---|---|---|---|---|---|---|---|---|---|---|---|---|---|---|---|---|
| row 1  | 1 |   |   |   |   | 6 | 7 | 8 | 9 |    |    | 12 | 13 | 14 | 15 | 16 |    |    |
| row 6  | 1 |   | 3 |   | 5 | 6 |   |   | 9 | 10 |    | 12 |    | 14 | 15 |    |    | 18 |
| row 9  | 1 | 2 |   | 4 |   | 6 |   |   | 9 |    | 11 | 12 |    | 14 | 15 |    | 17 |    |
| row 12 | 1 |   |   |   |   | 6 | 7 | 8 | 9 |    |    | 12 | 13 | 14 | 15 |    |    |    |
| row 14 | 1 |   | 3 |   | 5 | 6 |   |   | 9 | 10 |    | 12 |    | 14 | 15 |    |    | 18 |
| row 15 | 1 | 2 |   | 4 |   | 6 |   |   | 9 |    | 11 | 12 |    | 14 | 15 |    | 17 |    |
|        | 1 | 2 | 3 | 4 | 5 | 6 | 7 | 8 | 9 | 10 | 11 | 12 | 13 | 14 | 15 | 16 | 17 | 18 |
|        |   |   |   |   |   |   |   |   | Column Numbers | | | | | | | | | |

The question is, can one use channels 1, 6, 9 12, 14 and 15 simultaneously? If each of these channel numbers is repeated in each of the columns corresponding to all six of these channels, the answer is yes. That is, if all six channels have qualifying elements in common in those columns corresponding to the channels, then those channels with common qualifying elements are non-interfering.

Heretofore, it has never been shown that six channels can come in simultaneously. A set of examples, based on the above set of six channels, prove that this can be done.

EXAMPLE 1.

In this example, six simultaneous signals representing a binary "1" are sent over the six channels under consideration. The bit pattern and composite signal strength is as shown in the following chart:

| CHANNEL # | BIT PATTERN | | | | | | | | BINARY BIT |
|---|---|---|---|---|---|---|---|---|---|
| 1  | +1 | −1 | +1 | −1 |  0 |  0 |  0 |  0 | "1" |
| 6  | +1 | −1 |  0 |  0 | +1 | −1 |  0 |  0 | "1" |
| 9  | +1 | −1 |  0 |  0 |  0 |  0 | +1 | −1 | "1" |
| 12 | +1 |  0 | +1 |  0 |  0 | −1 |  0 | −1 | "1" |
| 14 | +1 |  0 |  0 | −1 | +1 |  0 |  0 | −1 | "1" |
| 15 | +1 |  0 |  0 | −1 |  0 | −1 | +1 |  0 | "1" |
|    | +6 | −3 | +2 | −3 | +2 | −3 | +2 | −3 | (Total detected strength) |

Applying each of the six channel detection algorithms to this total detected signal strength gives the following results for the various channels:

1. $(+1, -1, +1, -1, -1, +1, -1, +1)$ *

$(+6, -3, +2, -3, +2, -3, +2, -3) =$ $+6 +3 +2 +3 -2 -3 -2 -3 = 4$

6. $(+1, -1, -1, +1, +1, -1, -1, +1)$ *

$(+6, -3, +2, -3, +2, -3, +2, -3) =$ $+6 +3 -2 -3 +2 +3 -2 -3 = 4$

9. $(+1, -1, -1, +1, -1, +1, +1, -1)$ *

$(+6, -3, +2, -3, +2, -3, +2, -3) =$ $+6 +3 -2 -3 -2 -3 +2 +3 = 4$

12. $(+1, +1, +1, +1, -1, -1, -1, -1)$ *

$(+6, -3, +2, -3, +2, -3, +2, -3) =$ $+6 -3 +2 -3 -2 +3 -2 +3 = 4$

14. $(+1, +1, -1, -1, +1, +1, -1, -1)$ *

$(+6, -3, +2, -3, +2, -3, +2, -3) =$ $+6 -3 -2 +3 +2 -3 -2 +3 = 4$

15. $(+1, +1, -1, -1, -1, -1, +1, +1)$ *

$(+6, -3, +2, -3, +2, -3, +2, -3) =$

-continued
$$+6\ -3\ -2\ +3\ -2\ +3\ +2\ -3\ =\ 4$$

All channels are separated properly.

EXAMPLE 2.

Assume now only channels 1, 9 and 14 come in with binary bit pattern "1" with no signal on the other channels. Applying the same analysis, one obtains the following bit patterns and total detected signal strength:

| CHANNEL # | BIT PATTERN | | | | | | | | BINARY BIT |
|---|---|---|---|---|---|---|---|---|---|
| 1 | +1 | −1 | +1 | −1 | 0 | 0 | 0 | 0 | "1" |
| 9 | +1 | −1 | 0 | 0 | 0 | 0 | +1 | −1 | "1" |
| 14 | +1 | 0 | 0 | −1 | +1 | 0 | 0 | −1 | "1" |
| TOTAL DETECTED STRENGTH | +3 | −2 | +1 | −2 | +1 | +0 | +1 | −2 | |

Applying the six detection algorithms for the channels under consideration to this total detected signal strength gives:

| Algorithm | 1 | +3 | +2 | +1 | +2 | −1 | +0 | −1 | −2 | = +4 |
| Algorithm | 6 | +3 | +2 | −1 | −2 | +1 | +0 | −1 | −2 | = 0 |
| Algorithm | 9 | +3 | +2 | −1 | −2 | −1 | +0 | +1 | +2 | = +4 |
| Algorithm | 12 | +3 | −2 | +1 | −2 | −1 | +0 | −1 | +2 | = 0 |
| Algorithm | 14 | +3 | −2 | −1 | +2 | +1 | +0 | −1 | +2 | = +4 |
| Algorithm | 15 | +3 | −2 | −1 | +2 | −1 | +0 | +1 | −2 | = 0 |

Again the results are correct.

EXAMPLE 3.

Assume the bit pattern is mixed with some channels containing a binary "1," others containing a binary "0," and one channel containing no signal at all. For this example, channels 1, 14 and 15 contain a binary "1," channels 6 and 12 contain a binary "0," and channel 9 contains no signal. The bit patterns and total detected signal strength is as follows:

| CHANNEL # | BIT PATTERN | | | | | | | | BINARY BIT |
|---|---|---|---|---|---|---|---|---|---|
| 1 | +1 | −1 | +1 | −1 | 0 | 0 | 0 | 0 | "1" |
| 6 | 0 | 0 | +1 | −1 | 0 | 0 | +1 | −1 | "0" |
| 9 | 0 | 0 | 0 | 0 | 0 | 0 | 0 | 0 | No binary bit |
| 12 | 0 | −1 | 0 | −1 | +1 | 0 | +1 | 0 | "0" |
| 14 | +1 | 0 | 0 | −1 | +1 | 0 | 0 | −1 | "1" |
| 15 | +1 | 0 | 0 | −1 | 0 | −1 | +1 | 0 | "1" |
| TOTAL DETECTED STRENGTH | +3 | −2 | +2 | −5 | +2 | −1 | +3 | −2 | |

Applying the six detection algorithms for the channels under consideration gives:

| Algorithm | 1 | +3 | +2 | −2 | −5 | −2 | −1 | −3 | −2 | = +4 |
| Algorithm | 6 | +3 | +2 | −2 | −5 | +2 | +1 | −3 | −2 | = −4 |
| Algorithm | 9 | +3 | +2 | −2 | −5 | −2 | −1 | +3 | +2 | = 0 |
| Algorithm | 12 | +3 | −2 | +2 | −5 | −2 | +1 | −3 | +2 | = −4 |
| Algorithm | 14 | +3 | −2 | −2 | +5 | +2 | −1 | −3 | +2 | = +4 |
| Algorithm | 15 | +3 | −2 | −2 | +5 | −2 | +1 | +3 | −2 | = +4 |

Again the results are correct.

Determination of channels selection for simultaneous inbound communication is now very easy using matrix $[A_x]$.

The method described above can be applied to any number of cycles of the 60 Hz carrier and to any number of pulses used to describe a binary bit. Moreover, it lends itself to computerized generation of combinations of non-interfering simultaneous channels.

Channel grouping:

Matrix $[A_x]$ is replicated below with the "X"s replaced by the detection algorithm number. If for a group of lines channel numbers are common to the group of lines, then the group of channels represent independent channels.

| 1 | 2 | 3 | 4 | 5 | 6 | 7 | 8 | 9 | 10 | 11 | 12 | 13 | 14 | 15 | 16 | 17 | 18 |
|---|---|---|---|---|---|---|---|---|---|---|---|---|---|---|---|---|---|
|   | 2 |   | 4 | 5 |   | 7 |   | 9 |    | 11 |    | 13 |    | 15 |    | 17 | 18 |
|   |   | 3 | 4 | 5 | 6 |   | 8 |   | 10 |    |    |    | 14 |    | 16 | 17 | 18 |
|   | 2 | 3 | 4 |   |   |   | 8 | 9 | 10 | 11 |    |    |    | 15 | 16 | 17 |    |
| 1 |   | 3 |   | 5 | 6 |   |   | 9 | 10 |    | 12 |    | 14 | 15 |    |    | 18 |
| 1 | 2 |   |   | 5 |   | 7 | 8 |   |    | 11 | 12 | 13 |    |    | 16 |    | 18 |
| 1 |   | 3 | 4 |   |   | 7 | 8 |   | 10 |    | 12 | 13 |    |    | 16 | 17 |    |
| 1 | 2 |   | 4 |   | 6 |   |   | 9 |    | 11 | 12 |    | 14 | 15 |    | 17 |    |
|   |   | 3 | 4 | 5 | 6 |   | 8 |   | 10 |    |    |    | 14 |    | 16 | 17 | 18 |
|   | 2 |   | 4 | 5 |   | 7 |   | 9 |    | 11 |    | 13 |    | 15 |    | 17 | 18 |
| 1 |   |   |   |   | 6 | 7 | 8 | 9 |    |    | 12 | 13 | 14 | 15 | 16 |    |    |
| 1 | 2 |   |   | 5 |   | 7 | 8 |   |    | 11 | 12 | 13 |    |    | 16 |    | 18 |
| 1 |   | 3 |   | 5 | 6 |   |   | 9 | 10 |    | 12 |    | 14 | 15 |    |    | 18 |

-continued

| | | | | | | | | | | | |
|---|---|---|---|---|---|---|---|---|---|---|---|
| 1 | 2 | | 4 | | 6 | | | 9 | | 11 | 12 | | 14 | 15 | | 17 |
| 1 | | 3 | 4 | | | 7 | 8 | | 10 | | 12 | 13 | | | 16 | 17 |
| | 2 | 3 | 4 | | | | 8 | 9 | 10 | 11 | | | | 15 | 16 | 17 |
| | 2 | 3 | | 5 | 6 | 7 | | | 10 | 11 | | 13 | 14 | | | | 18 |

To simplify the search of groups having the maximum number of independent channels, we separate out the groups of lines which start with a 1, 2 and 3.

By using the search method mentioned above, one quickly determines that six is the maximum number of independent channels per group and that there are six such groups, denoted by the letters of the alphabet A, B, C, D, E and F. Applying this methodology of search, one quickly finds out that all groups of lines starting with numbers larger than three result in a number of independent channels less than six and that these groups of channels are mere subsets of A, B, C, D, E and F. The labelled group matrix of those groups which includes line or channel number "1" are as follows:

```
A           A       A       A
B           B B     B       B B A A B
1               6 7 8 9         12 13 14 15 16
1     3   5 6           9 10    12    14 15              18
1 2       5       7 8           11 12 13        16       18
1     3 4         7 8        10 12 13           16 17
1 2   4       6           9     11 12    14 15     17
1             6 7 8 9           12 13 14 15 16
1 2       5       7 8           11 12 13        16       18
1     3   5 6           9 10    12    14 15              18
1 2   4       6           9     11 12    14 15     17
1     3 4         7 8        10 12 13           16 17
```

Similarly the group matrix whose members start with line or channel number "2" are as follows:

```
D                               D
C         C D     D       C     C       D       C   C D
2         4 5     7       9     11      13      15  17 18
2  3      4         8 9 10 11                   15 16 17
2  3        5 6 7      10 11       13 14                18
2           5     7 8     11 12 13        16            18
2         4   6           9        11 12    14 15   17
2         4 5     7       9        11    13      15  17 18
2           5     7 8     11 12 13          16           18
2         4   6           9        11 12    14 15   17
2  3      4         8 9 10 11                   15 16 17
2  3        5 6 7      10 11       13 14                18
```

And, the group matrix of those groups which start with line or channel number "3" are as follows:

```
F                   F
E     E F  F     E  E              F       E    E  F
3     4 5  6     8  10             14      16   17 18
3     4             8 9 10 11         15    16  17
3        5 6 7       10 11     13 14                18
3        5 6           9 10  12    14 15            18
3     4        7 8     10    12 13       16  17
3     4 5 6          8 10             14    16  17 18
3       5  6           9 10  12    14 15            18
3     4        7 8     10    12 13       16  17
3        5 6 7       10 11     13 14                18
```

The groups of independent channels as labelled A, B, C, D, E, and F above are depicted below:

| Group label | Channel numbers | | | | | |
|---|---|---|---|---|---|---|
| A | 1 | 6 | 9 | 12 | 14 | 15 |

-continued

| Group label | Channel numbers | | | | | |
|---|---|---|---|---|---|---|
| B | 1 | 7 | 8 | 12 | 13 | 16 |
| C | 2 | 4 | 9 | 11 | 15 | 17 |
| D | 2 | 5 | 7 | 11 | 13 | 18 |
| E | 3 | 4 | 8 | 10 | 16 | 17 |
| F | 3 | 5 | 6 | 10 | 14 | 18 |

Thus, there are six sets of channels, each set containing six mutually non-interfering channels.

It should be realized that after the number of channels have been established and non-interfering sets of channels identified (including their detection algorithms), one can model various noise conditions and determine which set of non-interfering channels have the best noise immunity or other desirable properties.

Figure 2:
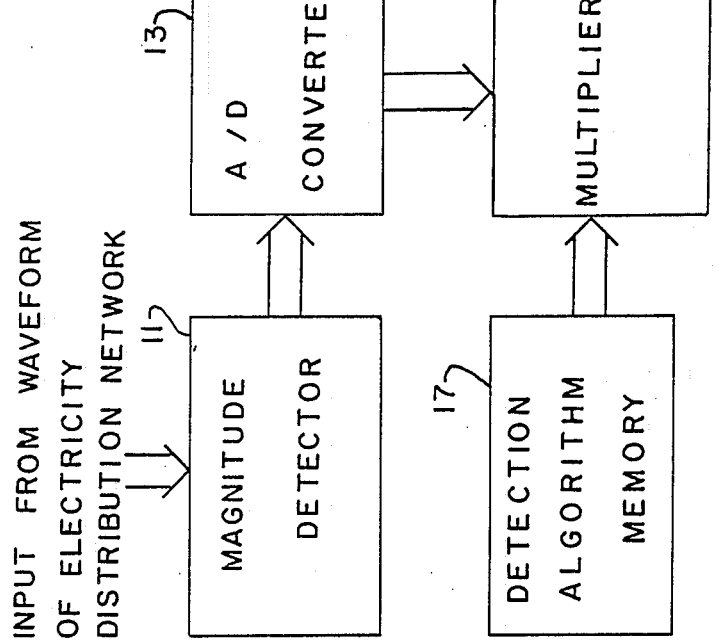
FIG. 2 is a block diagram illustrating the operation of the system of the present invention.

From the above (and with particular reference to FIG. 2), it can be seen that the system of the present invention obtains its input from the waveform of an electricity distribution network as is conventional done in such types of communications systems. The magnitude of this input, in particular the magnitudes (including sign) of the current pulses present at the zero crossings of the waveform, is detected by a magnitude detector 11. That is, the present invention detects not only the presence of a current pulse at the zero crossing, but also the magnitude of that pulse.

The measured magnitudes are converted by an analog-to-digital converter 13 to digital form and supplied to a multiplier 15. In this discussion it should be realized that the various components can be integrated together into single devices or separated out from each other depending upon the predilections of the designer.

The multiplier also has as an input the detection algorithms described above for the various channels. These are supplied from a detection algorithm memory 17 or they can be built into the software running multiplier 15 if the multiplier is software driven.

The output of the multiplier gives the signals present on the six independent channels selected as described above. Of course, with other communications protocols, more or fewer than six independent channels might be present. The present invention is not limited to any specific communications protocol or number of independent channels.

In view of the above, it will be seen that the various objects and features of this invention are achieved and other advantageous results obtained.

As various changes could be made in the above constructions and methods without departing from the scope of the invention, it is intended that all matter contained in the above description and shown in the accompanying drawings shall be interpreted as illustrative and not in a limiting sense.

I claim:

1. A system for simultaneously transmitting signals composed of binary digits inbound over an electricity distribution network and for detecting said simultaneously transmitted inbound signals, each binary digit being composed of a first predetermined number of current pulses superimposed on preselected zero crossings contained within said first predetermined number of cycles of the voltage waveform of the electricity distribution network, comprising:

designating a second predetermined number of channels, said second predetermined number being at least fifty percent greater than the first predetermined number, each channel being defined by specifying the set of zero crossings which define a binary "1" for that channel and the set of zero crossings which define a binary "0" for that channel, said sets for each channel being mutually exclusive and each containing the first predetermined number of zero crossings, each set being unique with respect to all the other sets for the various channels;

sending binary digits inbound simultaneously over the second predetermined number of channels;

for the first predetermined number of cycles of the voltage waveform, measuring the magnitudes of the current pulses at all the zero crossings;

for each channel, applying a detection algorithm to the measured magnitudes of the current pulses for all the zero crossings, each detection algorithm being unique with respect to all the other detection algorithms, the detection algorithms being selected so that all the designated channels are non-interfering even though all use exactly the same zero crossings of the voltage waveform;

detecting a binary "1" for any particular channel if the application of the detection algorithm for that channel to the measured magnitudes of the current pulses for all the zero crossings equals a third predetermined number;

detecting a binary "0" for any particular channel if the application of the detection algorithm for that channel to the measured magnitudes of the current pulses for all the zero crossings equals the negative of the third predetermined number; and detecting the absence of a binary digit for any particular channel if the application of the detection algorithm for that channel to the measured magnitudes of the current pulses for all the zero crossings equals a number other than the third predetermined number or its negative.

2. The system as set forth in claim 1 wherein the first predetermined number is four and the second predetermined number is six so that six independent channels are available in a system which uses four zero crossings to define each binary "1" and four other zero crossings to define each binary "0" out of every eight zero crossings.

3. The system as set forth in claim 1 wherein the first and third predetermined numbers are equal.

4. The system as set forth in claim 1 wherein each binary "1" is represented by exactly two positive current pulses and exactly two negative current pulses.

5. The system as set forth in claim 1 wherein the maximum number of independent, non-interfering channels is six.

6. The system as set forth in claim 5 wherein there are six distinct groups of channels, each containing the maximum number of independent, non-interfering channels.

7. A method of identifying non-interfering inbound channels in a system for simultaneously transmitting signals composed of binary digits inbound over an electricity distribution network and for detecting said simultaneously transmitted inbound signals, each binary digit being composed of a first predetermined number of current pulses superimposed on preselected zero crossings contained within a second predetermined numbers of cycles of the voltage waveform of the electricity distribution network, each channel being defined by specifying the set of zero crossings which define a binary "1" for that channel and the set of zero crossings which define a binary "0" for that channel, said sets for each channel being mutually exclusive and each containing the first predetermined number of zero crossings, the method comprising:

identifying the potential channels by organizing the zero crossings in the second predetermined number of cycles of the electricity distribution network waveform into sets, each set containing the first predetermined number of separate zero crossings, each pair of mutually exclusive sets constituting a potential channel;

defining first and second pure pulse patterns for each potential channel, each pure pulse pattern being a set of "j" numbers, where "j" is the number of zero crossings in the second predetermined number of cycles of the waveform, one of the pure pulse patterns for each channel representing the presence of a binary "1" in that channel with no signal present in any other channel, and the other pure pulse pattern for each channel representing the presence of a binary "0" in that channel with no signal present in any other channel, each pure pulse pattern being unique;

selecting detection matrices for the channels, each detection matrix being unique with respect to the other detection matrices, each detection matrix when multiplied by a pure pulse pattern resulting in a first preselected number when the pure pulse pattern represents a binary "1" in the channel corresponding to that detection matrix, resulting in a second preselected number when the pure pulse pattern represents a binary "0" in the channel corresponding to that detection matrix, and resulting in a third preselected number when no signal is present;

forming a composite detection matrix from the detection matrixes for all the potential channels, each row of the composite detection matrix being the detection matrix for the channel corresponding to the row number of that row;

forming a composite pulse pattern matrix from the first pure pulse patterns for each channel, each column of the composite pulse pattern matrix being the first pure pulse pattern for the channel corresponding to the column number of that column;

multiplying the composite detection matrix times the composite pulse pattern matrix to form a channel analysis matrix, each element of the channel analysis matrix being a number resulting from the application of the detection matrix for the channel corresponding to the column number of the element to the first pure pulse pattern for the channel corresponding to the row number of the element;

categorizing as qualifying elements only those elements of the channel analysis matrix whose numerical value corresponds to the first preselected number or the third preselected number; and determining which sets of rows of the channel analysis matrix have in common qualifying elements in the columns corresponding to all the row numbers of the set, the row numbers of each such set representing a set of independent channels.

8. The method as set forth in claim 7 further including the step of selecting from the sets of rows representing independent channels a set having the largest number of rows, thereby maximizing the number of independent channels for inbound communication over an electricity distribution system.

9. The method as set forth in claim 7 wherein the inbound signals originate from discrete signal sources, further including the step of assigning independent channels to the various signal sources, on the electricity distribution network to maximize the signal rate inbound from said signal sources.

10. The method as set forth in claim 7 wherein the current pulses for positive-to-negative zero crossings are positive and the current pulses for negative-to-positive zero crossings are negative, further including the step of excluding from consideration all potential channels that have unequal numbers of positive and negative pulses defining a binary "1" signal.

11. The method as set forth in claim 7 wherein each detection matrix consists of a series of numbers all of which are either "+1" or "−1".

12. The method as set forth in claim 7 wherein the number of cycles in which a binary digit is contained is the same as the number of pulses used to define a binary "1".

13. The method as set forth in claim 12 wherein the number of cycles in which the binary digit is contained is four.

14. The method as set forth in claim 7 wherein the preselected number indicating the presence of a binary "0" is the negative of the preselected number indicating the presence of binary "1".

15. The method as set forth in claim 7 further including the step of decoding the information in the independent channels by measuring the magnitude of the current pulses in the predetermined number of half cycles and multiplying the detection matrices for the independent channels by a matrix of numbers representing said magnitudes, the results for each channel being the first preselected number if the signal in that channel represents a binary "1", being the second preselected number if the signal is that channel represents a binary "0", and being the third preselected number if no signal was present in that channel, even though the numbers representing the magnitudes of the current pulses have an absolute value greater than any of the first, second and third preselected numbers.

16. The method as set forth in claim 7 wherein all potential channels are excluded which use other than two positive pulses and two negative pulses to define a binary "1".

17. The method as set forth in claim 7 wherein the maximum number of independent channels is six.

18. The method as set forth in claim 17 wherein there are six groups of channels containing the maximum number of independent channels per group.

19. The method as set forth in claim 7 wherein the composite pulse pattern matrix is the composite matrix corresponding to the pulse patterns for a binary "1" in the channels.

20. The method as set forth in claim 7 wherein the maximum number of potential channels is reduced by applying a predetermined criterion to the channels so that the number of potential channels is eighteen.

* * * * *